(12) United States Patent
Hattori et al.

(10) Patent No.: US 11,473,946 B2
(45) Date of Patent: *Oct. 18, 2022

(54) RESIN DECORATIVE PART AND DIAL PLATE

(71) Applicant: Yazaki Corporation, Tokyo (JP)

(72) Inventors: Tatsuya Hattori, Shizuoka (JP); Teruomi Sano, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 514 days.

This patent is subject to a terminal disclaimer.

(21) Appl. No.: 16/560,985

(22) Filed: Sep. 4, 2019

(65) Prior Publication Data

US 2020/0080871 A1  Mar. 12, 2020

(30) Foreign Application Priority Data

Sep. 7, 2018 (JP) .............................. JP2018-168101

(51) Int. Cl.
*G01D 11/28* (2006.01)
*G01P 1/08* (2006.01)
*B60K 35/00* (2006.01)

(52) U.S. Cl.
CPC ............... *G01D 11/28* (2013.01); *G01P 1/08* (2013.01); *B60K 35/00* (2013.01); *B60K 2370/23* (2019.05); *B60K 2370/341* (2019.05); *B60K 2370/688* (2019.05); *B60K 2370/695* (2019.05)

(58) Field of Classification Search
CPC ........... G01D 11/28; G01P 1/08; B60K 35/00; B60K 2370/23; B60K 2370/341; B60K 2370/688; B60K 2370/695; B60R 13/0256; B60R 13/02; B44F 1/045

See application file for complete search history.

(56) References Cited

U.S. PATENT DOCUMENTS

| 4,875,433 A | * | 10/1989 | Tsukamoto | G01D 11/28 116/335 |
| 6,802,276 B2 | * | 10/2004 | Sugimoto | G01D 11/28 116/286 |
| 10,996,084 B2 | * | 5/2021 | Hattori | G01D 13/04 |
| 2020/0079050 A1 | * | 3/2020 | Hattori | B60K 35/00 |
| 2020/0079142 A1 | * | 3/2020 | Hattori | B44F 1/045 |
| 2020/0080872 A1 | * | 3/2020 | Hattori | B60K 37/02 |

(Continued)

FOREIGN PATENT DOCUMENTS

| JP | H08108511 A | * | 4/1996 |
| JP | 2001-113894 A |  | 4/2001 |
| JP | 2006-214906 A |  | 8/2006 |

(Continued)

*Primary Examiner* — Nimeshkumar D Patel
*Assistant Examiner* — Tania Courson
(74) *Attorney, Agent, or Firm* — Kenealy Vaidya LLP

(57) ABSTRACT

A carbon decorative panel includes a clear decoration body and a carbon color layer. The clear decoration body has a main body 10a transmitting light and includes a carbon-toned irregular surface provided on the opposite side to the viewer side of the main body and having a carbon-toned pattern formed with protrusions and depressions. The carbon color layer is laminated on the carbon-toned irregular surface, includes a reflective surface reflecting incident light transmitted through the clear decoration body, and is colored in a carbon color.

9 Claims, 7 Drawing Sheets

(56) References Cited

U.S. PATENT DOCUMENTS

2020/0166387 A1\* 5/2020 Hattori ................. B32B 27/308

FOREIGN PATENT DOCUMENTS

| JP | 2008-134164 A | | 6/2008 |
|----|---------------|---|--------|
| JP | 2010-216941 A | | 9/2010 |
| JP | 2015093423 A | \* | 5/2015 |
| JP | 2017-102016 A | | 6/2017 |
| JP | 2017102016 A | \* | 6/2017 |
| WO | 2012/020706 A1 | | 2/2012 |

\* cited by examiner

RESIN DECORATIVE PART AND DIAL PLATE

CROSS-REFERENCE TO RELATED APPLICATION(S)

The present application claims priority to and incorporates by reference the entire contents of Japanese Patent Application No. 2018-168101 filed in Japan on Sep. 7, 2018.

BACKGROUND OF THE INVENTION

1. Field of the Invention

The present invention relates to a resin decorative part and a dial plate.

2. Description of the Related Art

Conventionally, Japanese Patent Application Laid-open No. 2017-102016 discloses, as an example of dials, an instrument dial that displays a vehicle speed and the like in a visible manner. This instrument dial includes a light-transmitting substrate, a clear layer provided on the viewer side of the substrate to present protrusions and depressions of a carbon surface in a pseudo manner, and a print layer provided on the opposite side to the viewer side of the substrate to present a carbon-toned pattern. The instrument dial uses a clear layer to present a carbon surface in a pseudo manner and thereby improves the texture of the carbon-toned decoration.

It has been desired, for example, to further improve the texture of the carbon-toned decoration in the instrument dial disclosed in Japanese Patent Application Laid-open No. 2017-102016.

SUMMARY OF THE INVENTION

The present invention is then made in view of the foregoing and aims to provide a resin decorative part and a dial plate that can appropriately ensure the texture of the carbon-toned decoration.

A resin decorative part according to one aspect of the present invention includes a clear decoration body having a main body transmitting light, the clear decoration body including a carbon-toned irregular surface disposed on an opposite side to a viewer side of the main body and having a carbon-toned pattern formed with protrusions and depressions; and a carbon color layer laminated on the carbon-toned irregular surface and including a reflective surface reflecting light transmitted through the clear decoration body, the carbon color layer being colored in a carbon color.

According to another aspect of the present invention, in the resin decorative part, it is preferable that the reflective surface is in contact with the protrusions and depressions of the carbon-toned irregular surface.

According to still another aspect of the present invention, in the resin decorative part, it is preferable that the main body includes a substrate transmitting light and a clear layer laminated on a surface of the substrate on an opposite side to the viewer side and having the carbon-toned irregular surface.

According to still another aspect of the present invention, in the resin decorative part, it is preferable that the clear layer is formed of a photocurable resin material that is cured when irradiated with light.

According to still another aspect of the present invention, in the resin decorative part, it is preferable that the main body is formed of a resin material transmitting light, and the carbon color layer includes: a base material colored in a carbon color; and a bright material added to the base material and having a refractive index different from that of the resin material and a gloss.

A dial plate according to still another aspect of the present invention includes a clear decoration body having a main body disposed in a vehicle and transmitting light, the clear decoration body including a carbon-toned irregular surface disposed on an opposite side to a viewer side of the main body and having a carbon-toned pattern formed with protrusions and depressions; a carbon color layer laminated on the carbon-toned irregular surface and including a reflective surface reflecting light transmitted through the clear decoration body, the carbon color layer being colored in a carbon color; a low reflection layer laminated on the viewer side of the main body to suppress reflection of light; and a design display section disposed on the main body and transmitting light such that a design related to the vehicle is illuminated.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Modes for carrying out the present invention (embodiments) will be described in detail with reference to the drawings. The present invention is not limited by the description of embodiments below. The components described below include those easily conceived by those skilled in the art and those substantially equivalent. The configurations described below can be combined as appropriate. The configurations are susceptible to a variety of omission, substitution, and modification without departing from the spirit of the invention.

Embodiments

A carbon decorative panel (resin decorative part) 1 and a dial plate 100 according to an embodiment will be described.

Figure 1:
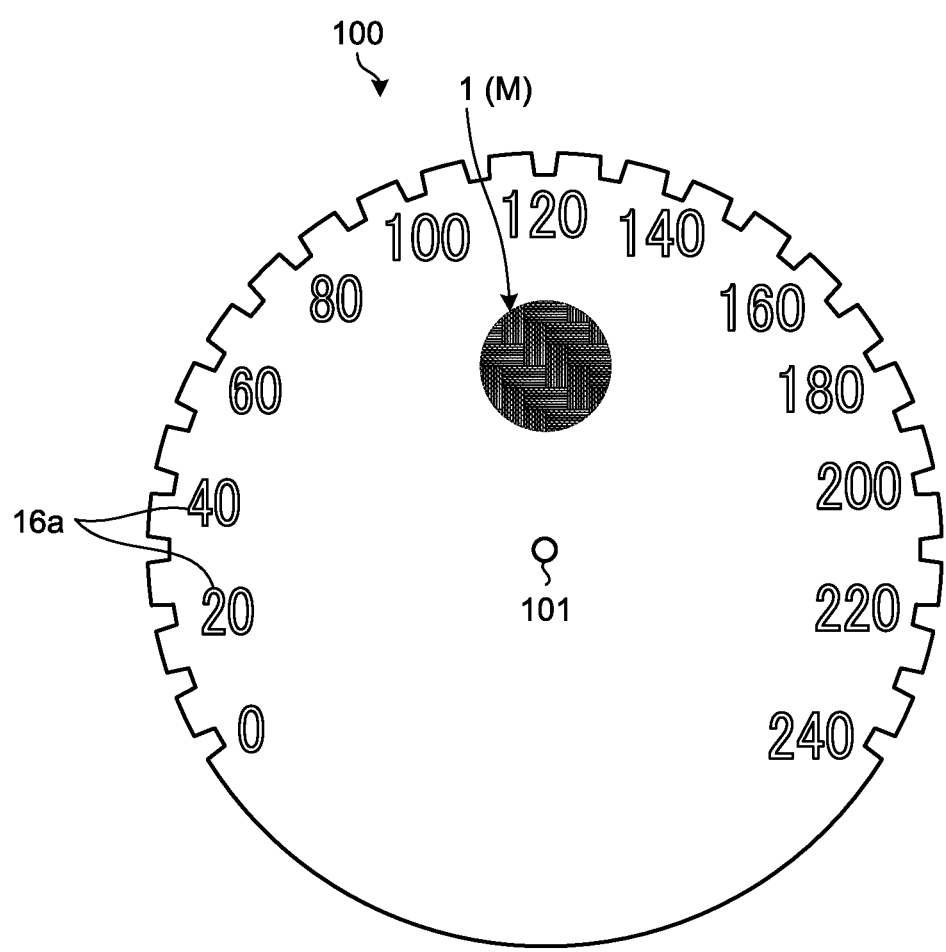
FIG. 1 is a front view illustrating a configuration example of a dial plate according to an embodiment.
Figure 2:
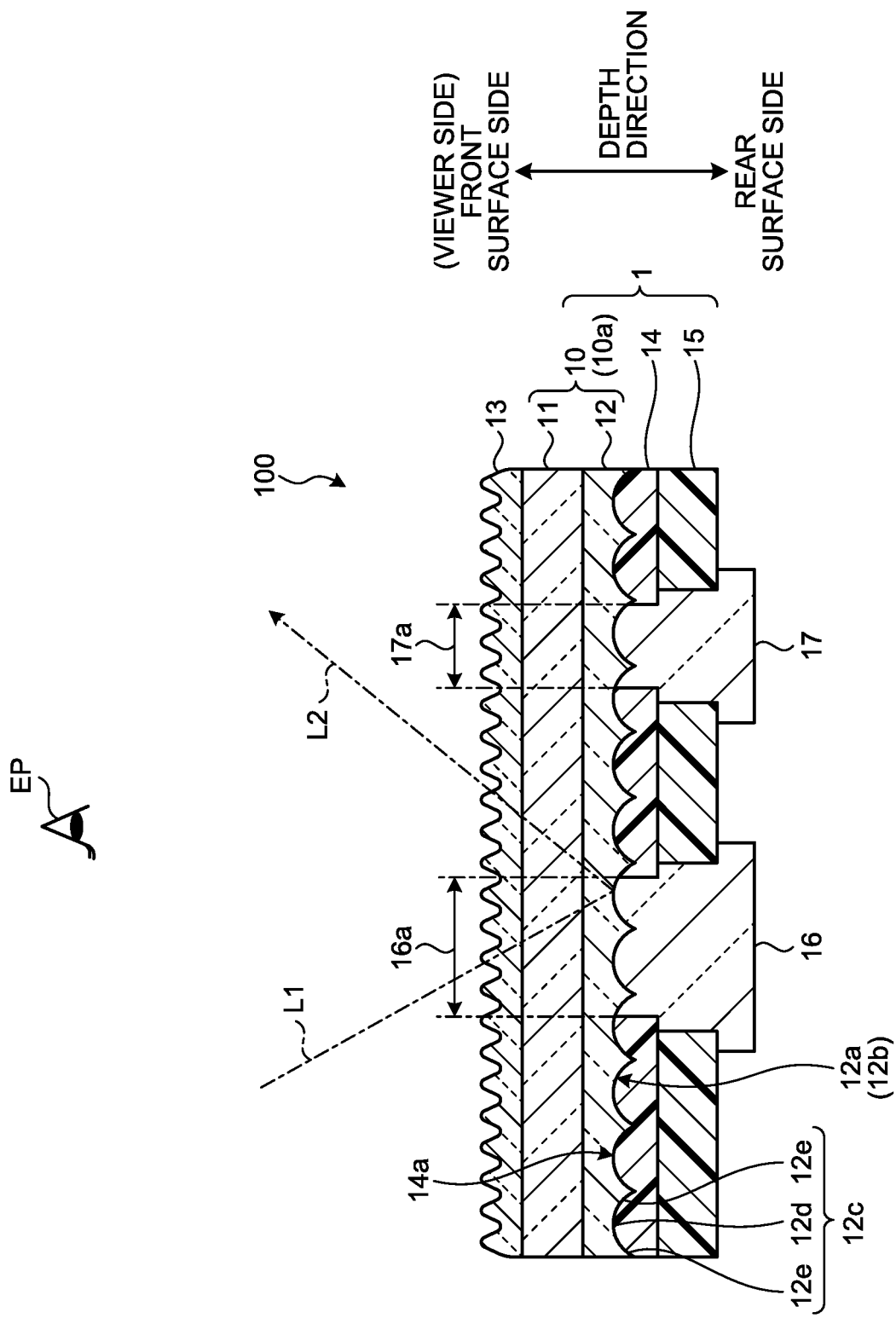
FIG. 2 is a cross-sectional view illustrating a configuration example of the dial plate according to the embodiment.
Figure 3:
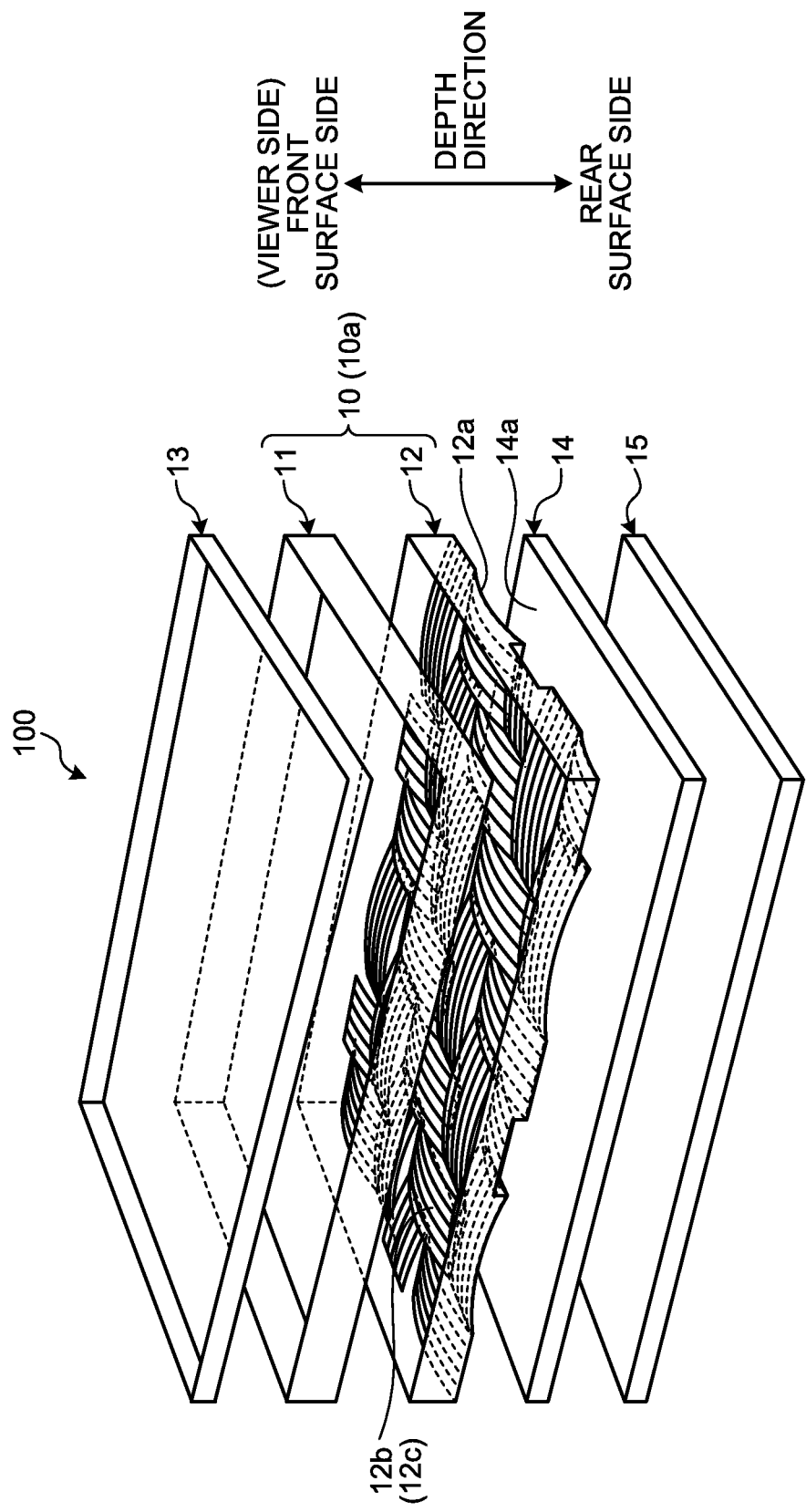
FIG. 3 is an exploded perspective view illustrating a configuration example of the dial plate according to the embodiment.
Figure 4:
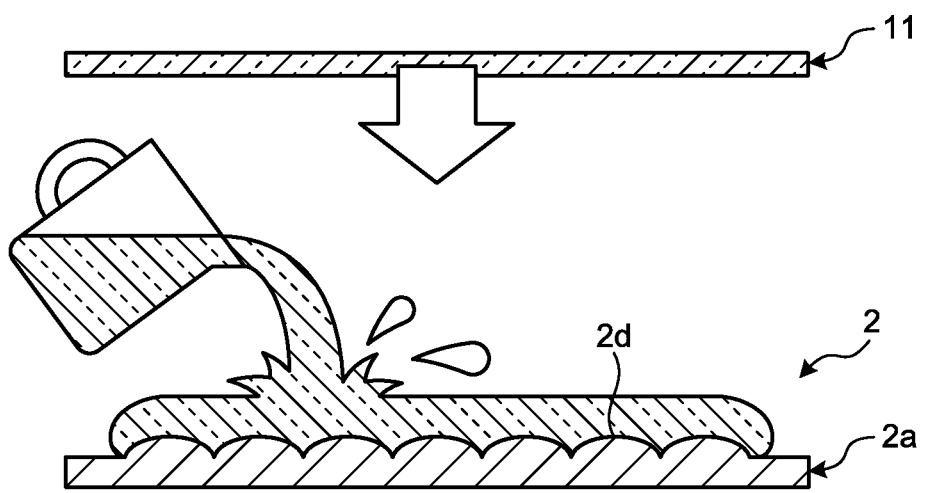
FIG. 4 is a side view illustrating a first step of imprinting in the dial plate according to the embodiment.
Figure 5:
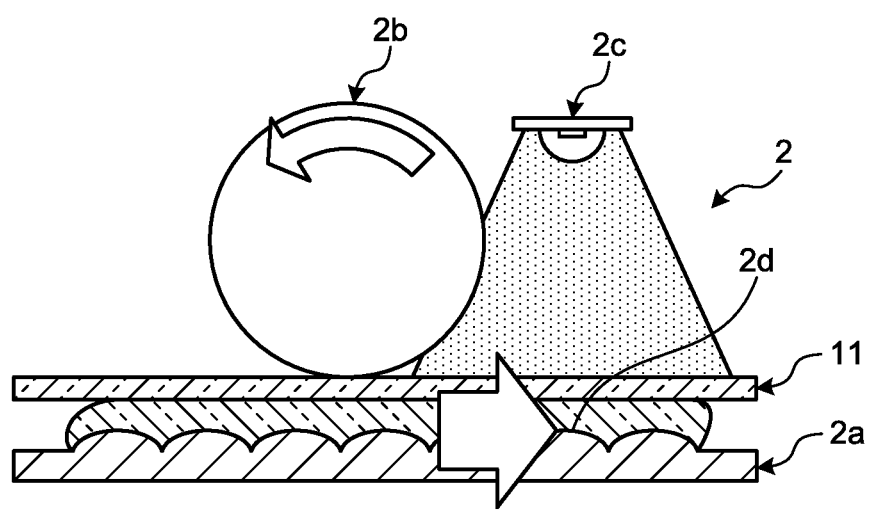
FIG. 5 is a side view illustrating a second step of imprinting in the dial plate according to the embodiment.
Figure 6:
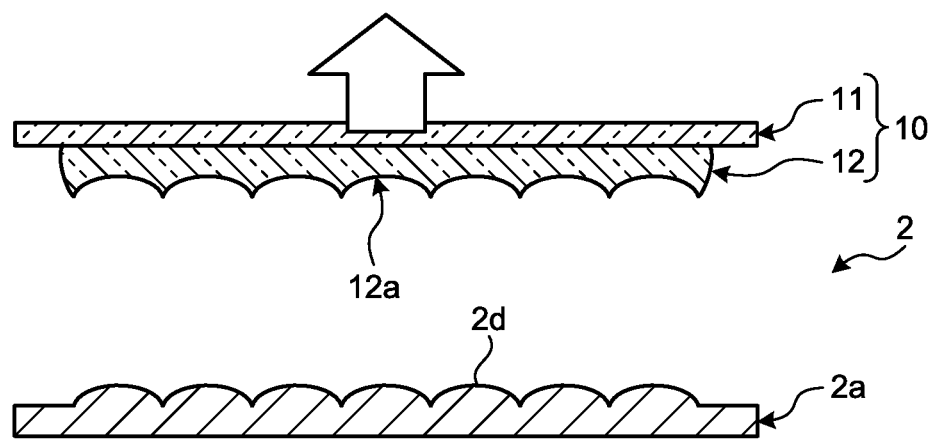
FIG. 6 is a side view illustrating a third step of imprinting in the dial plate according to the embodiment.

FIG. 1 is a front view illustrating a configuration example of the dial plate 100 according to an embodiment. FIG. 2 is a cross-sectional view illustrating a configuration example of the dial plate 100 according to the embodiment. FIG. 3 is an exploded perspective view illustrating a configuration example of the dial plate 100 according to the embodiment. FIG. 3 schematically illustrates the features of the layered structure of the dial plate 100. FIG. 4 is a side view illustrating a first step of imprinting in the dial plate 100 according to the embodiment. FIG. 5 is a side view illustrating a second step of imprinting in the dial plate 100 according to the embodiment. FIG. 6 is a side view illustrating a third step of imprinting in the dial plate 100 according to the embodiment.

As illustrated in FIG. 1, the carbon decorative panel 1 is applied to the dial plate 100 as a resin decorative part having a carbon-toned pattern M. The dial plate 100 is applied to a vehicle indicator (not illustrated) mounted on a vehicle. The vehicle indicator constitutes a vehicle-mounted meter and, for example, is mounted on an instrument panel provided in the dashboard of a vehicle to display a variety of information related to the vehicle as information available for driving the vehicle.

The dial plate 100 is, for example, a dial plate for a speedometer and formed as a circular flat plate. The dial plate 100 has a through hole 101 at the center, in which a not-illustrated pointer is inserted. The dial plate 100 has a plurality of character display sections (design display sections) 16a in the circumferential direction near the outer periphery to show the speed. For example, each character display section 16a emits light radiating from a light source (not illustrated) arranged in the dial plate 100 on the opposite side to the viewer side viewed by the driver, to the viewer side. The driver then can recognize a character in the character display section 16a that shows the vehicle speed in the dial plate 100. Although FIG. 1 partially illustrates the carbon-toned pattern M, the carbon-toned pattern M is provided, for example, in a region excluding the regions of the character display sections 16a.

As used herein the depth direction of the dial plate 100 typically corresponds to the front-back direction of the vehicle to which the dial plate 100 is applied. The front surface side of the dial plate 100 is the side facing the driver's seat of the vehicle and typically the viewer side viewed by the driver sitting in the driver's seat, that is, the driver's eyepoint EP side. By contrast, the rear surface side of the dial plate 100 is the opposite side to the front surface side in the depth direction and typically the side accommodated in the inside of the instrument panel.

As illustrated in FIG. 2, the dial plate 100 includes a carbon decorative panel 1, an anti-glare (AG) print layer 13 as a low reflection layer, a design layer 16, and a smoke layer 17. The carbon decorative panel 1 includes a clear decoration body 10, a carbon color layer 14, and a light-blocking print layer 15. As illustrated in FIG. 3, in the dial plate 100, the AG print layer 13, the clear decoration body 10, the carbon color layer 14, and the light-blocking print layer 15 are layered in this order from the front surface side to the rear surface side in the depth direction.

The clear decoration body 10 has a main body 10a that transmits light of wavelengths in the visible light range. The main body 10a includes a substrate 11 and a clear layer 12. The substrate 11 serves as the base of the dial plate 100. The substrate 11 is formed of, for example, a resin material such as acrylic resin and polycarbonate that transmits light of wavelengths in the visible light range. The substrate 11 is formed by shaping a resin material into a desired flat plate shape, for example, using a mold.

The clear layer 12 has a carbon-toned pattern M. The clear layer 12 is provided by imprinting described later on the opposite side to the viewer side of the substrate 11, that is, on the rear surface side of the substrate 11. The clear layer 12 is formed of, for example, a photocurable resin material (ink) that transmits light of wavelengths in the visible light range and is cured when irradiated with ultraviolet (UV) rays. As illustrated in FIG. 2, the clear layer 12 includes a carbon-toned irregular surface 12a. The carbon-toned irregular surface 12a is provided on the clear layer 12 on the opposite side to the substrate 11, and a plurality of projections and depressions 12b form the carbon-toned pattern M. The protrusions and depressions 12b constitute a plurality of unit patterns 12c. Each unit pattern 12c constitutes a weave of pseudo carbon fiber bundles presenting actual pre-impregnated carbon fiber bundles in a pseudo manner, in which each individual pseudo carbon fiber presenting an actual carbon fiber in a pseudo manner is formed. As used herein pre-impregnation refers to the woven actual carbon fibers impregnated with resin and cured. The unit pattern 12c has a top portion 12d and a pair of curved portions 12e. The top portion 12d is positioned at the center of the unit pattern 12c in the extending direction of a pseudo carbon fiber bundle. A pair of curved portions 12e are positioned on both sides of the top portion 12d in the extending direction of a pseudo carbon fiber bundle and are formed in a curved shape. The top portion 12d of the unit pattern 12c is formed in a concave shape from the opposite side to the viewer side toward the viewer side.

The AG print layer 13 suppresses reflection of light. The AG print layer 13 is laminated on the viewer side of the substrate 11 and provided over the entire surface of the substrate 11. The AG print layer 13 is formed, for example, by screen printing on the viewer side of the substrate 11. The AG print layer 13 has minute protrusions and depressions on the viewer side of the substrate 11. The AG print layer 13 diffuses incident light L1 incident from the viewer side on the minute protrusions and depressions to suppress regular reflection of incident light L1 on the surface of the substrate 11 on the viewer side.

The carbon color layer 14 is a colored layer colored in a carbon color. As used herein carbon color is, for example, black (carbon black). The carbon color layer 14 is laminated on the clear layer 12 on the carbon-toned irregular surface 12a side. The carbon color layer 14 is formed, for example, by printing ink of a resin material on the carbon-toned irregular surface 12a. The carbon color layer 14 is formed, for example, by screen printing. For example, a screen printer prints ink colored in the carbon color on the carbon-toned irregular surface 12a. The screen printer prints ink, for example, in the region excluding the region of the character display section 16a and the region of an indicator display section (design display section) 17a on the carbon-toned irregular surface 12a. The carbon-toned pattern M thus does not appear in the region of the character display section 16a and the region of the indicator display section 17a.

The carbon color layer 14 includes a base material of a resin material colored in the carbon color and a bright material added to the base material and does not transmit light. The bright material has a refractive index different from that of the resin material of the clear layer 12 and has a gloss. The bright material includes, for example, aluminum, silver, or pearl. The carbon color layer 14 has a reflective surface 14a on the carbon-toned irregular surface 12a side. The reflective surface 14a is provided in contact with the protrusions and depressions 12b of the carbon-toned irregular surface 12a and has the shape of the carbon-toned irregular surface 12a. That is, the reflective surface 14a has the same shape as the shape of each unit pattern 12c of the carbon-toned irregular surface 12a. Specifically, a portion of the reflective surface 14a that is in contact with the top portion 12d of the unit pattern 12c is formed in a concave shape from the opposite side to the viewer side toward the viewer side as viewed from the viewer (eyepoint EP) side. In this way, in the reflective surface 14a, a weave of pseudo carbon fiber bundles is formed as viewed from the viewer (eyepoint EP) side, and each individual pseudo carbon fiber is formed. The reflective surface 14a reflects incident light L1 transmitted through the clear decoration body 10 toward the viewer side as reflected light L2.

The light-blocking print layer 15 is a light-blocking layer that blocks light. The light-blocking print layer 15 is laminated on the carbon color layer 14 on the opposite side to the viewer side. The light-blocking print layer 15 is formed, for example, by printing ink of a resin material on the carbon color layer 14. The light-blocking print layer 15 is formed, for example, using a screen printer. The screen printer prints ink colored in a light-blocking color on the rear surface side of the carbon color layer 14. The screen printer prints ink on the rear surface side of the carbon color layer 14, for example, in a region excluding the region of the character display section 16a and the region of the indicator display section 17a. The light-blocking print layer 15 blocks light incident from the opposite side (rear surface side) to the viewer side.

The design layer 16 forms the character display section 16a. The character display section 16a transmits light such that a design related to the vehicle is illuminated. The design layer 16 is laminated on the carbon-toned irregular surface 12a side of the clear layer 12. The design layer 16 is formed, for example, by printing ink of a resin material in the region of the character display section 16a in the clear layer 12. The design layer 16 is formed, for example, using a screen printer. The screen printer prints translucent ink colored in a desired color in the region of the character display section 16a in the clear layer 12. The design layer 16 transmits light emitted from a light source (not illustrated) provided on the opposite side (rear surface side) to the viewer side and emits the transmitted light to the clear layer 12. The character display section 16a shows a vehicle speed in the dial plate 100 in a display manner in which the carbon-toned pattern M is not superimposed.

The smoke layer 17 forms the indicator display section 17a. The indicator display section 17a transmits light such that a design related to the vehicle is illuminated. The smoke layer 17 is laminated on the carbon-toned irregular surface 12a side of the clear layer 12. The smoke layer 17 is formed, for example, by printing ink of a resin material in the region of the indicator display section 17a in the clear layer 12. The smoke layer 17 is formed, for example, using a screen printer. The screen printer prints ink colored in a light-reducing color in the region of the indicator display section 17a in the clear layer 12. The smoke layer 17 transmits light emitted from a light source (not illustrated) provided on the opposite side (rear surface side) to the viewer side and emits the transmitted light to the clear layer 12. The indicator display section 17a shows an indicator on the dial plate 100 in a display manner in which the carbon-toned pattern M is not superimposed.

Referring now to FIG. 4 to FIG. 6, the steps of imprinting in the dial plate 100 are described. The operator performs imprinting using an imprinting system 2. The imprinting system 2 includes a mold 2a, a roller 2b, and a UV metal-halide lamp 2c. The mold 2a has a plurality of protrusions and depressions 2d on its surface for forming the unit patterns 12c of the carbon-toned pattern M. As illustrated in FIG. 4, the operator first pours a liquid photocurable resin material (ink) onto the surface of the mold 2a with the protrusions and depressions 2d. As illustrated in FIG. 5, the operator then operates the imprinting system 2 to press the substrate 11 against the photocurable resin material poured on the surface of the mold 2a using the roller 2b while irradiating the photocurable resin material with UV light using the UV metal-halide lamp 2c to cure the photocurable resin material. As illustrated in FIG. 6, the operator then operates the imprinting system 2 to move the photocurable resin material (clear layer 12) laminated on the substrate 11 away from the mold 2a. The clear decoration body 10 with the carbon-toned irregular surface 12a thus can be formed.

As described above, the carbon decorative panel 1 according to the embodiment includes the clear decoration body 10 and the carbon color layer 14. The clear decoration body 10 has the main body 10a transmitting light and includes the carbon-toned irregular surface 12a provided on the opposite side to the viewer side of the main body 10a and having the carbon-toned pattern M formed with the protrusions and depressions 12b. The carbon color layer 14 is laminated on the carbon-toned irregular surface 12a, includes the reflective surface 14a reflecting incident light L1 transmitted through the clear decoration body 10, and is colored in the carbon color.

In the conventional carbon decorative panel, for example, a clear layer having a carbon-toned pattern is provided on the viewer side of the substrate and reflects light by the difference in refractive index between the air layer and the clear layer to represent a carbon-toned pattern. Accordingly, the panel is whitish as a whole and it is difficult to ensure the texture of the carbon-toned pattern. By contrast, in the carbon decorative panel 1 according to the embodiment, the reflective surface 14a of the carbon color layer 14 that represents actual pre-impregnated carbon fiber bundles in a pseudo manner reflects incident light L1 and the reflected light L2 represents the carbon-toned pattern M. With this configuration, the carbon decorative panel 1 can represent reflected light reflected by a reflective surface of actual pre-impregnated carbon fiber bundles in a pseudo manner. The carbon decorative panel 1 thus can achieve the appearance that resembles an actual pre-impregnated carbon member. Accordingly, the carbon decorative panel 1 can appropriately ensure the texture of the carbon-toned pattern M.

In the above-described carbon decorative panel 1, the reflective surface 14a is provided in contact with the protrusions and depressions 12b of the carbon-toned irregular surface 12a. With this configuration, the reflective surface 14a of the carbon decorative panel 1 has the shape equivalent to the shape of the carbon-toned irregular surface 12a. That is, the reflective surface 14a has the pattern of unit patterns 12c of the carbon-toned irregular surface 12a. That is, in the reflective surface 14a, a weave of pseudo carbon fiber bundles is formed as viewed from the viewer (eyepoint EP) side, and each individual pseudo carbon fiber is formed. The carbon decorative panel 1 thus can achieve the appearance that resembles an actual pre-impregnated carbon member.

In the above-described carbon decorative panel 1, the main body 10a of the clear decoration body 10 includes the substrate 11 transmitting light and the clear layer 12 laminated on the surface of the substrate 11 on the opposite side to the viewer side and having the carbon-toned irregular surface 12a. In this way, the carbon decorative panel 1 can be formed with the substrate 11 and the clear layer 12 as separate components.

In the above-described carbon decorative panel 1, the clear layer 12 is formed of a photocurable resin material that is cured when irradiated with light. In this configuration, the carbon decorative panel 1 can be formed by imprinting.

In the above-described carbon decorative panel 1, the main body 10a of the clear decoration body 10 is formed of a resin material that transmits light. The carbon color layer 14 includes a base material colored in the carbon color and a bright material added to the base material and having a refractive index different from that of the resin material and a gloss. With this configuration, the carbon decorative panel 1 can appropriately reflect incident light L1 on the reflective surface 14a of the carbon color layer 14 by the difference in refractive index between the clear decoration body 10 and the carbon color layer 14.

The dial plate 100 according to the embodiment includes the clear decoration body 10, the carbon color layer 14, the AG print layer 13, the character display section 16a (design layer 16), and the indicator display section 17a (smoke layer 17). The clear decoration body 10 has the main body 10a provided on the vehicle and transmitting light. The clear decoration body 10 includes the carbon-toned irregular surface 12a provided on the opposite side to the viewer side of the main body 10a and having the carbon-toned pattern M formed with the protrusions and depressions 12b. The carbon color layer 14 is laminated on the carbon-toned irregular surface 12a, includes the reflective surface 14a reflecting light transmitted through the clear decoration body 10, and is colored in the carbon color. The AG print layer 13 is laminated on the viewer side of the main body 10a and suppresses reflection of light. The character display section 16a and the indicator display section 17a are provided on the main body 10a and transmits light such that a design related to the vehicle is illuminated. With this configuration, the dial plate 100 achieves the similar effects as the carbon decorative panel 1 described above.

Modifications

Figure 7:
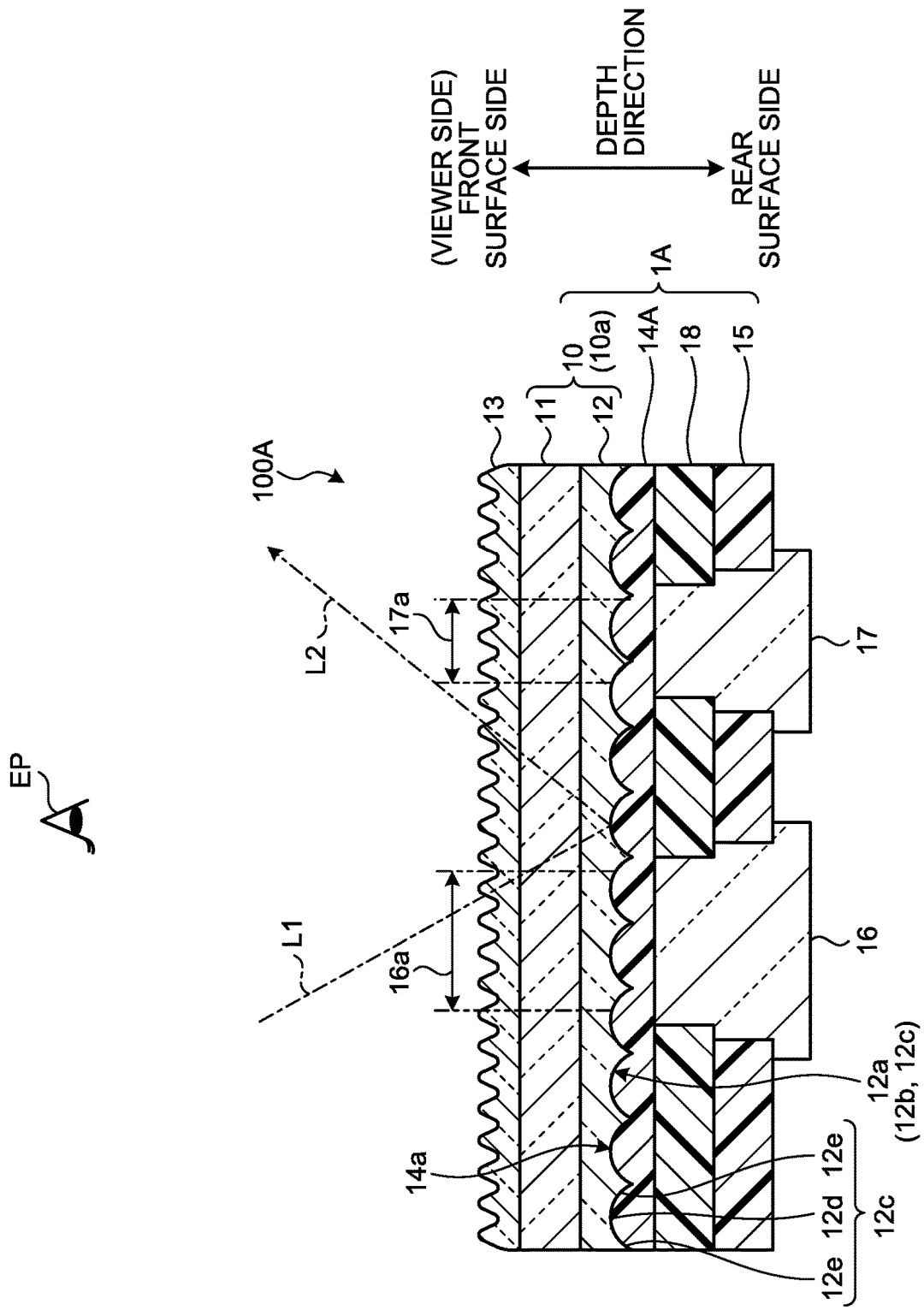
FIG. 7 is a cross-sectional view illustrating a configuration example of the dial plate according to a first modification of the embodiment.

A first modification of the embodiment will now be described. FIG. 7 is a cross-sectional view illustrating a configuration example of a dial plate 100A according to the first modification of the embodiment. In the dial plate 100 according to the embodiment, the carbon color layer 14 is laminated in a region excluding the region of the character display section 16a and the region of the indicator display section 17a, so that the carbon-toned pattern M does not appear in the regions of the character display section 16a and the indicator display section 17a. In the dial plate 100A according to the first modification, the carbon color layer 14A is laminated also in the region of the character display section 16a and the region of the indicator display section 17a, so that the carbon-toned pattern M appears also in the regions of the character display section 16a and the indicator display section 17a. In the dial plate 100A according to the first modification, the components equivalent to those of the dial plate 100 according to the embodiment are denoted by the same reference signs and a detailed description thereof is omitted.

As illustrated in FIG. 7, the dial plate 100A according to the first modification includes a carbon decorative panel 1A, an AG print layer 13, a design layer 16, and a smoke layer 17. The carbon decorative panel 1A includes a clear decoration body 10, a carbon color layer 14A, a carbon color layer 18, and a light-blocking print layer 15. The carbon color layer 14A includes a base material of a resin material colored in the carbon color and a bright material added to the base material and is translucent. The carbon color layer 14A is printed on the entire carbon-toned irregular surface 12a of the clear layer 12 in the clear decoration body 10. The carbon color layer 14A has a reflective surface 14a on the carbon-toned irregular surface 12a side. The reflective surface 14a reflects incident light L1 transmitted through the clear decoration body 10 toward the viewer side as reflected light L2.

The carbon color layer 18 is a colored layer colored in the carbon color. The carbon color layer 18 is laminated on the rear surface side of the carbon color layer 14A. The carbon color layer 18 is formed, for example, by printing ink of a resin material on the rear surface side of the carbon color layer 14A. The carbon color layer 18 is formed, for example, by screen printing. A screen printer prints, for example, ink colored in the carbon color on the rear surface side of the carbon color layer 14A. The screen printer prints ink on the rear surface side of the carbon color layer 14A, for example, in a region excluding the region of the character display section 16a and the region of the indicator display section 17a. The carbon color layer 18 preferably includes a base material of a resin material colored in the carbon color and a bright material added to the base material. However, the bright material is not necessarily included in the base material. The light-blocking print layer 15 is laminated on the carbon color layer 18 on the opposite side to the viewer side.

The design layer 16 is laminated on the rear surface side of the carbon color layer 14A in the region of the character display section 16a. The design layer 16 transmits light emitted from a light source provided on the opposite side (rear surface side) to the viewer side and emits the transmitted light to the carbon color layer 14A. The character display section 16a shows a vehicle speed in the dial plate 100 in a display manner in which the carbon-toned pattern M is superimposed.

The smoke layer 17 is laminated on the rear surface side of the carbon color layer 14A in the region of the indicator display section 17a. The smoke layer 17 transmits light emitted from a light source provided on the opposite side (rear surface side) to the viewer side and emits the transmitted light to the carbon color layer 14A. The indicator display section 17a shows an indicator in the dial plate 100 in a display manner in which the carbon-toned pattern M is superimposed. In this way, the dial plate 100A according to the first modification can display a vehicle speed and an indicator in the dial plate 100 in a display manner in which the carbon-toned pattern M is superimposed.

Figure 8:
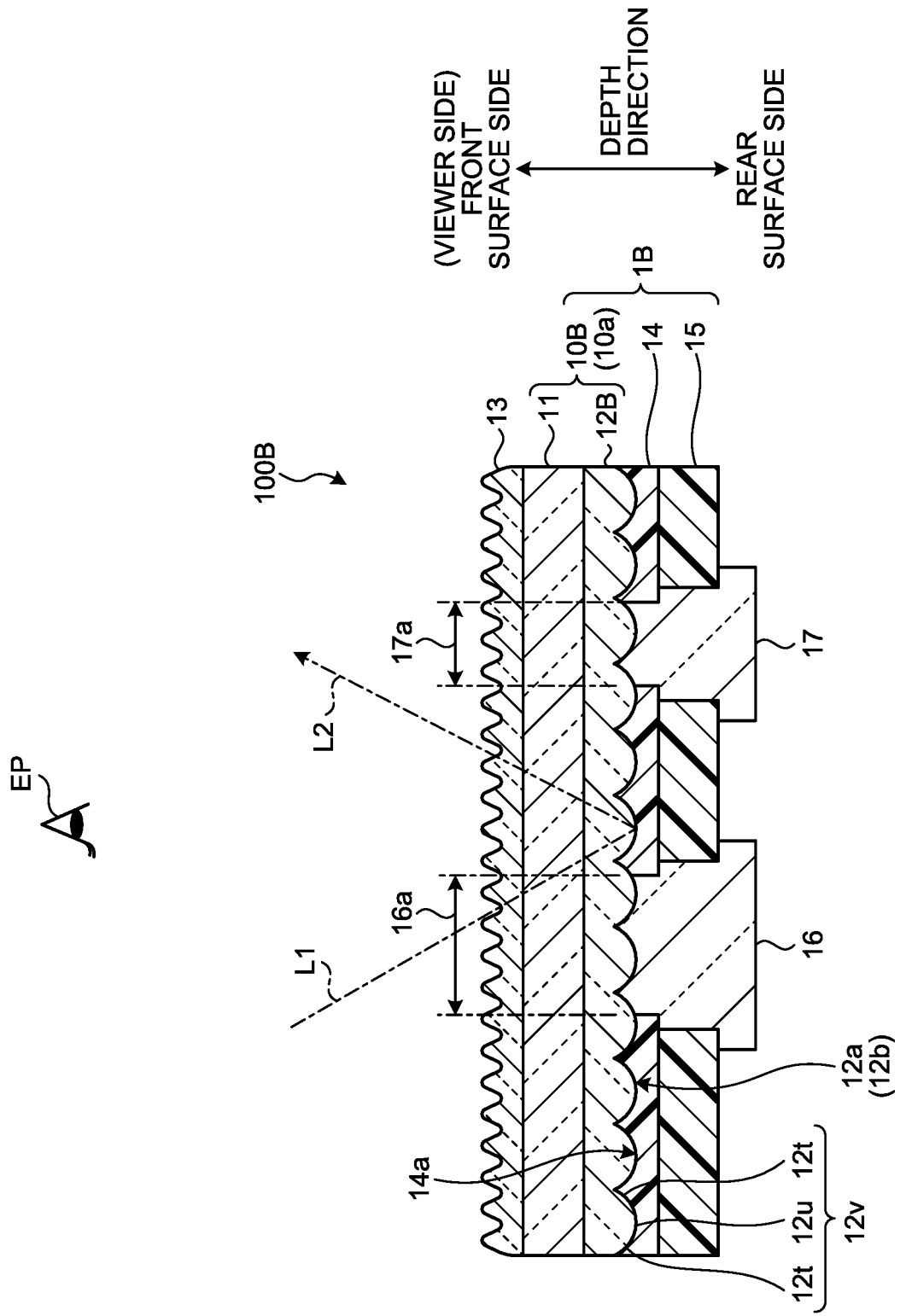
FIG. 8 is a cross-sectional view illustrating a configuration example of the dial plate according to a second modification of the embodiment.

A second modification of the embodiment will now be described. FIG. 8 is a cross-sectional view illustrating a configuration example of a dial plate 100B according to the second modification of the embodiment. As illustrated in FIG. 8, a carbon decorative panel 1B according to the second modification differs from the carbon decorative panel 1 according to the embodiment in that a carbon-toned irregular surface 12a of a clear layer 12B is formed to be convex from the viewer side toward the opposite side to the viewer side. In the carbon decorative panel 1B according to the second modification, the components equivalent to those of the carbon decorative panel 1 according to the embodiment are denoted by the same reference signs and a detailed description thereof is omitted.

The carbon decorative panel 1B includes a clear decoration body 10B, a carbon color layer 14, and a light-blocking print layer 15. The clear decoration body 10B has a substrate 11 and a clear layer 12B.

The clear layer 12B has a carbon-toned pattern M. The clear layer 12B is provided on the rear surface side of the substrate 11 by imprinting. For example, the clear layer 12B is formed of a photocurable resin material (ink) that transmits light of wavelengths in the visible light range and is cured when irradiated with UV light. The clear layer 12B includes a carbon-toned irregular surface 12a. The carbon-toned irregular surface 12a is provided on the clear layer 12B on the opposite side to the substrate 11 and has the carbon-toned pattern M formed with a plurality of protrusions and depressions. The protrusions and depressions form a plurality of unit patterns 12v. Each unit pattern 12v constitutes a weave of pseudo carbon fiber bundles presenting actual pre-impregnated carbon fiber bundles in a pseudo manner, in which each individual pseudo carbon fiber presenting an actual carbon fiber in a pseudo manner is formed. The unit pattern 12v has a top portion 12u and a pair of curved portions 12t. The top portion 12u of the unit pattern 12v is formed to be convex from the viewer side toward the opposite side to the viewer side.

The carbon color layer 14 has a reflective surface 14a on the carbon-toned irregular surface 12a side. The reflective surface 14a is provided in contact with the protrusions and depressions 12b of the carbon-toned irregular surface 12a and has the shape of the carbon-toned irregular surface 12a. That is, the reflective surface 14a has the same shape as the shape of each unit pattern 12v of the carbon-toned irregular surface 12a. In the reflective surface 14a, a weave of pseudo carbon fiber bundles is formed as viewed from the viewer (eyepoint EP) side, and each individual pseudo carbon fiber is formed. The reflective surface 14a reflects incident light L1 transmitted through the clear decoration body 10B toward the viewer side as reflected light L2.

As described above, the carbon decorative panel 1B according to the second modification includes the clear decoration body 10B and the carbon color layer 14. The clear decoration body 10B has the main body 10a transmitting light and includes the carbon-toned irregular surface 12a provided on the opposite side of the main body 10a to the viewer side and having the carbon-toned pattern M formed with the protrusions and depressions 12b. The carbon color layer 14 is laminated on the carbon-toned irregular surface 12a, includes the reflective surface 14a reflecting incident light L1 transmitted through the clear decoration body 10B, and is colored in the carbon color.

With this configuration, the carbon decorative panel 1B can represent reflected light reflected by a reflective surface of actual pre-impregnated carbon fiber bundles in a pseudo manner. The carbon decorative panel 1B thus can achieve the appearance that resembles an actual pre-impregnated carbon member. Accordingly, the carbon decorative panel 1B can appropriately ensure the texture of the carbon-toned pattern M.

In the foregoing description, the carbon decorative panel 1 (1A) is applied to the dial plate 100 (100A) as a decorative part having the carbon-toned pattern M. However, embodiments are not limited thereto and may be applied to a decorative sheet for an instrument panel.

The dial plate 100 (100A) described above includes the carbon decorative panel 1 (1A), the AG print layer 13, the design layer 16, and the smoke layer 17. However, embodiments are not limited thereto and may have any other configuration.

The main body 10a of the clear decoration body 10 described above includes the substrate 11 and the clear layer 12 formed as separated components by imprinting. However, embodiments are not limited thereto. The main body 10a of the clear decoration body 10 may be formed, for example, such that the substrate 11 and the clear layer 12 are integrally formed by resin injection molding.

The clear layer 12 described above is formed on the substrate 11 by UV-curing imprinting. However, embodiments are not limited thereto. For example, thermal-curing imprinting may be used.

The dial plate 100 (100A) described above includes the AG print layer 13 as a low reflection layer. However, a member other than the AG print layer 13 may be used to form a low reflection layer.

The AG print layer 13, the carbon color layer 14, the light-blocking print layer 15, the design layer 16, and the smoke layer 17 are formed using a screen printer in the example above. However, embodiments are not limited thereto. For example, they may be formed using an inkjet printer.

In the dial plate 100A, the carbon-toned irregular surface 12a of the clear layer 12 may be formed to be convex from the viewer side toward the opposite side to the viewer side.

The resin decorative part and the dial plate according to the present embodiment include the clear decoration body including the carbon-toned irregular surface provided on the opposite side to the viewer side and the carbon color layer laminated on the carbon-toned irregular surface. This configuration enables light to be reflected by the reflective surface of the carbon color layer and appropriately ensures the texture of the carbon-toned decoration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A resin decorative part comprising:
   a clear decoration body having a main body transmitting light, the clear decoration body including a carbon-toned irregular surface disposed on an opposite side to a viewer side of the main body and having a carbon-toned weave pattern formed with protrusions and depressions that form a pseudo carbon fiber bundle; and
   a carbon color layer laminated on the carbon-toned irregular surface and the carbon color layer including a reflective surface reflecting light transmitted through the clear decoration body, the carbon color layer being colored in a carbon color, and the reflective surface is in contact with the carbon-toned irregular surface.

2. The resin decorative part according to claim 1, wherein the main body is formed of a resin material transmitting light, and
   the carbon color layer includes:
   a base material colored in a carbon color; and
   a bright material added to the base material and having a refractive index different from that of the resin material and a gloss.

3. The resin decorative part according to claim 1, wherein the reflective surface is in contact with the protrusions and depressions of the carbon-toned irregular surface.

4. The resin decorative part according to claim 3, wherein the main body is formed of a resin material transmitting light, and
   the carbon color layer includes:

a base material colored in a carbon color; and a bright material added to the base material and having a refractive index different from that of the resin material and a gloss.

5. The resin decorative part according to claim 1, wherein the main body includes a substrate transmitting light and a clear layer laminated on a surface of the substrate on an opposite side to the viewer side and having the carbon-toned irregular surface.

6. The resin decorative part according to claim 5, wherein the main body is formed of a resin material transmitting light, and the carbon color layer includes:

a base material colored in a carbon color; and a bright material added to the base material and having a refractive index different from that of the resin material and a gloss.

7. The resin decorative part according to claim 5, wherein the clear layer is formed of a photocurable resin material that is cured when irradiated with light.

8. The resin decorative part according to claim 7, wherein the main body is formed of a resin material transmitting light, and the carbon color layer includes:

a base material colored in a carbon color; and a bright material added to the base material and having a refractive index different from that of the resin material and a gloss.

9. A dial plate comprising:

a clear decoration body having a main body disposed in a vehicle and transmitting light, the clear decoration body including a carbon-toned irregular surface disposed on an opposite side to a viewer side of the main body and having a carbon-toned weave pattern formed with protrusions and depressions that form a pseudo carbon fiber bundle;

a carbon color layer laminated on the carbon-toned irregular surface and the carbon color layer including a reflective surface reflecting light transmitted through the clear decoration body, the carbon color layer being colored in a carbon color, and the reflective surface is in contact with the carbon-toned irregular surface;

a low reflection layer laminated on the viewer side of the main body to suppress reflection of light; and a design display section disposed on the main body and transmitting light such that a design related to the vehicle is illuminated.

* * * * *